United States Patent
Bates et al.

(10) Patent No.: US 7,088,465 B2
(45) Date of Patent: Aug. 8, 2006

(54) PRINTING MORE OR LESS OF A WEB PAGE

(75) Inventors: Cary L. Bates, Rochester, MN (US); Gilford F. Martino, Endwell, NY (US); John M. Santosuosso, Rochester, MN (US); Vincent T. Timon, III, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 758 days.

(21) Appl. No.: 10/225,912

(22) Filed: Aug. 22, 2002

(65) Prior Publication Data
US 2004/0036906 A1   Feb. 26, 2004

(51) Int. Cl.
G06F 3/12 (2006.01)

(52) U.S. Cl. ............ 358/1.15; 358/1.13; 358/1.1; 358/1.4; 358/402; 715/513

(58) Field of Classification Search .......... 358/1.15, 358/1.18, 1.13, 1.1, 1.4, 402; 715/513
See application file for complete search history.

(56) References Cited

U.S. PATENT DOCUMENTS

| | | | |
|---|---|---|---|
| 5,699,172 A | 12/1997 | Hattori et al. | |
| 5,706,414 A | 1/1998 | Pritchard | |
| 5,748,856 A | 5/1998 | Cariffe et al. | |
| 5,778,160 A * | 7/1998 | Smith | 358/1.9 |
| 5,946,450 A | 8/1999 | Ebner et al. | |
| 6,081,340 A * | 6/2000 | Klassen | 358/1.1 |
| 6,185,588 B1 | 2/2001 | Olson-Williams et al. | |
| 6,315,379 B1 | 11/2001 | Adams et al. | |
| 6,320,671 B1 * | 11/2001 | Kelley et al. | 358/1.18 |
| 6,342,950 B1 | 1/2002 | Tabata et al. | |
| 6,972,857 B1 * | 12/2005 | Mantell et al. | 358/1.14 |
| 6,981,213 B1 * | 12/2005 | Barmettler | 715/513 |

* cited by examiner

Primary Examiner—Kimberly Williams
Assistant Examiner—Andrew Lam
(74) Attorney, Agent, or Firm—Schmeiser, Olsen & Watts, LLP

(57) ABSTRACT

A method and for printing a web page of an Internet website. A web browser receives specification of a non-uniform spatial distribution of a material surface density $\rho(\underline{S})$ of a material used to print the web page, wherein $\underline{S}$ denotes a point on the surface. The web browser prints the web page on a surface by distributing the material on the surface in accordance with $\rho(\underline{S})$.

43 Claims, 12 Drawing Sheets

PRINTING MORE OR LESS OF A WEB PAGE

BACKGROUND OF THE INVENTION

1. Technical Field

The present invention relates to a method and system of printing a web page of an Internet website.

2. Related Art

Printing web pages of an Internet website may be expensive if many web pages are printed. Accordingly, a less expensive method and system is needed for printing web pages of the Internet website.

SUMMARY OF THE INVENTION

The present invention provides a method for printing a web page of a website on a surface so as to distribute a printing material on the surface in accordance with a non-uniform spatial distribution of a material surface density $\rho(\underline{S})$ of the material on the surface, wherein $\underline{S}$ denotes a point on the surface, said method comprising:

receiving, by a web browser, a specification of $\rho(\underline{S})$ as a function of a time interval $T(\underline{W})$ over which a point $\underline{W}$ on the web page has been appeared viewable to a user linked to the web page, and wherein $\underline{S}$ corresponds to $\underline{W}$ by a mapping relationship; and printing, by the web browser, the web page on the surface, including distributing the material on the surface in accordance with $\rho(\underline{S})$.

The present invention provides a method for printing a web page of an Internet website on a surface so as to distribute a printing material on the surface in accordance with a non-uniform spatial distribution of a material surface density $\rho(\underline{S})$ of the material on the surface, wherein $\underline{S}$ denotes a point on the surface, said method comprising:

receiving, by a web browser, a specification of $\rho(\underline{S})$ based on historical data relating to frequency of use of portions of the web page by users linked to the web page, and wherein $\rho(\underline{S})$ is a function of a statistically-averaged time interval $T_{AVE}(\underline{W})$ over which a point $\underline{W}$ on the web page has historically appeared viewable to said users linked to the web page; and printing, by the web browser, the web page on the surface, including distributing the material on the surface in accordance with $\rho(\underline{S})$.

The present invention provides a method for printing a web page of an Internet website on a surface so as to distribute a printing material on the surface in accordance with a non-uniform spatial distribution of a material surface density $\rho(\underline{S})$ of the material on the surface, wherein $\underline{S}$ denotes a point on the surface, said method comprising:

receiving, by a web browser, a specification of $\rho(\underline{S})$ in accordance with a selection having been made by a user linked to the web page, said selection being a selection of at least one region of the web page at which $\rho(\underline{S})=\rho_C$, wherein $\rho_C$ is a constant material surface density that is less than a default surface density at which the region would otherwise be printed.

printing, by the web browser, the web page on the surface, including distributing the material on the surface in accordance with $\rho(\underline{S})$ being equal to $\rho_C$ for the region.

The present invention provides a computer system comprising an algorithm for printing a web page of a website on a surface so as to distribute a printing material on the surface in accordance with a non-uniform spatial distribution of a material surface density $\rho(\underline{S})$ of the material on the surface, wherein $\underline{S}$ denotes a point on the surface, wherein the algorithm is adapted to:

receive a specification of $\rho(\underline{S})$ as a function of a time interval $T(\underline{W})$ over which a point $\underline{W}$ on the web page has been appeared viewable to a user linked to the web page, and wherein $\underline{S}$ corresponds to $\underline{W}$ by a mapping relationship; and printing the web page on the surface by having the material distributed on the surface in accordance with $\rho(\underline{S})$.

The present invention provides a computer system comprising an algorithm for printing a web page of an Internet website on a surface so as to distribute a printing material on the surface in accordance with a non-uniform spatial distribution of a material surface density $\rho(\underline{S})$ of the material on the surface, wherein $\underline{S}$ denotes a point on the surface, wherein the algorithm is adapted to:

receive a specification of $\rho(\underline{S})$ based on historical data relating to frequency of use of portions of the web page by users linked to the web page, and wherein $\rho(\underline{S})$ is a function of a statistically-averaged time interval $T_{AVE}(\underline{W})$ over which a point $\underline{W}$ on the web page has historically appeared viewable to said users linked to the web page; and print the web page on the surface by having the material distributed on the surface in accordance with $\rho(\underline{S})$.

The present invention provides a computer system comprising an algorithm for printing a web page of an Internet website on a surface so as to distribute a printing material on the surface in accordance with a non-uniform spatial distribution of a material surface density $\rho(\underline{S})$ of the material on the surface, wherein $\underline{S}$ denotes a point on the surface, wherein the algorithm is adapted to:

receive a specification of $\rho(\underline{S})$ in accordance with a selection having been made by a user linked to the web page, said selection being a selection of at least one region of the web page at which $\rho(\underline{S})=\rho_C$, wherein $\rho_C$ is a constant material surface density that is less than a default surface density at which the region would otherwise be printed; and printing the web page on the surface by having the material distributed on the surface in accordance with $\rho(\underline{S})$ being equal to $\rho_C$ for the region.

The present invention provides reduces the expense of printing web pages of an Internet website.

DETAILED DESCRIPTION OF THE INVENTION

Figure 1:
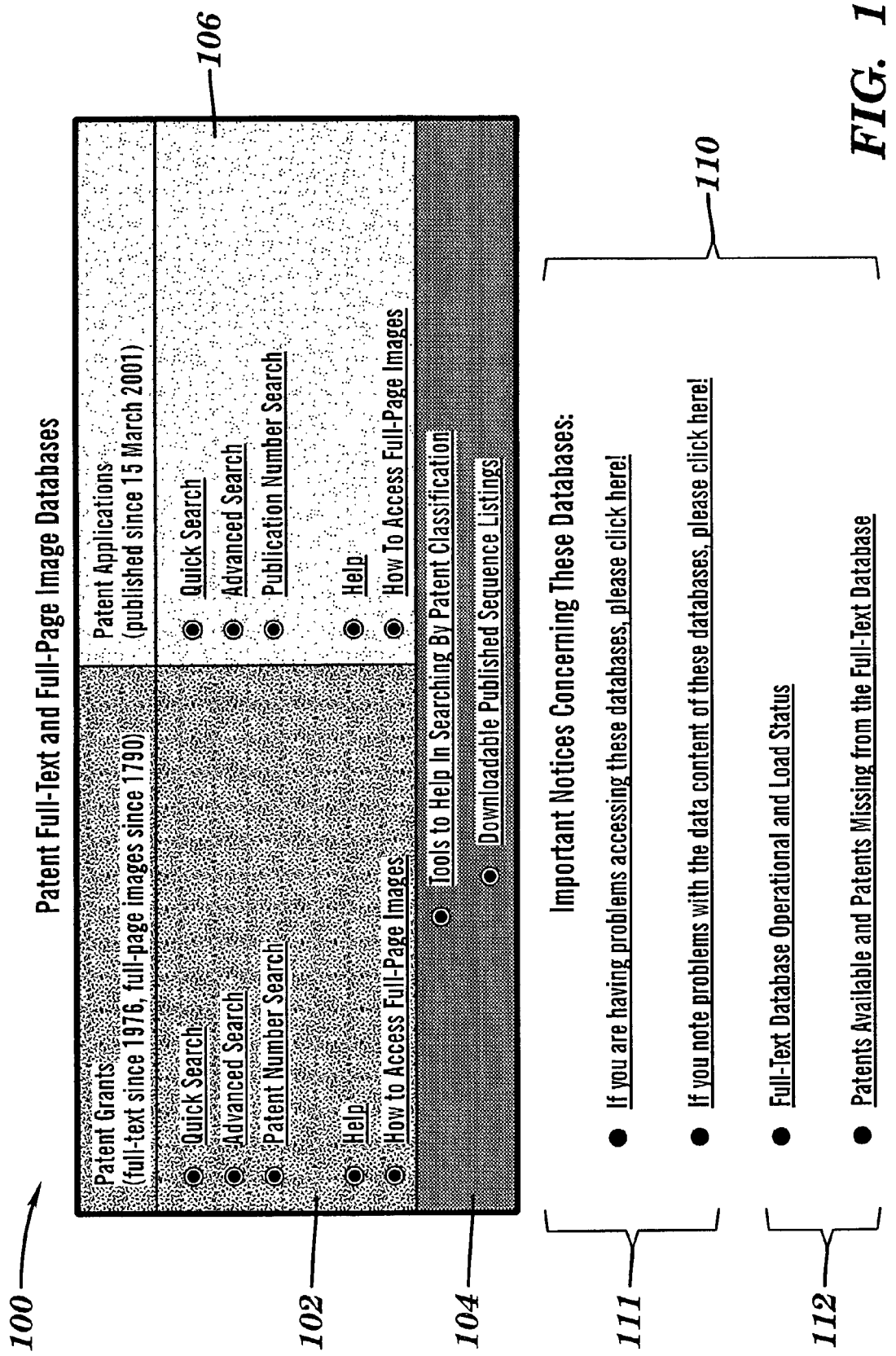
FIG. 1 depicts a web page, in accordance with embodiments of the present invention.
Figure 2:
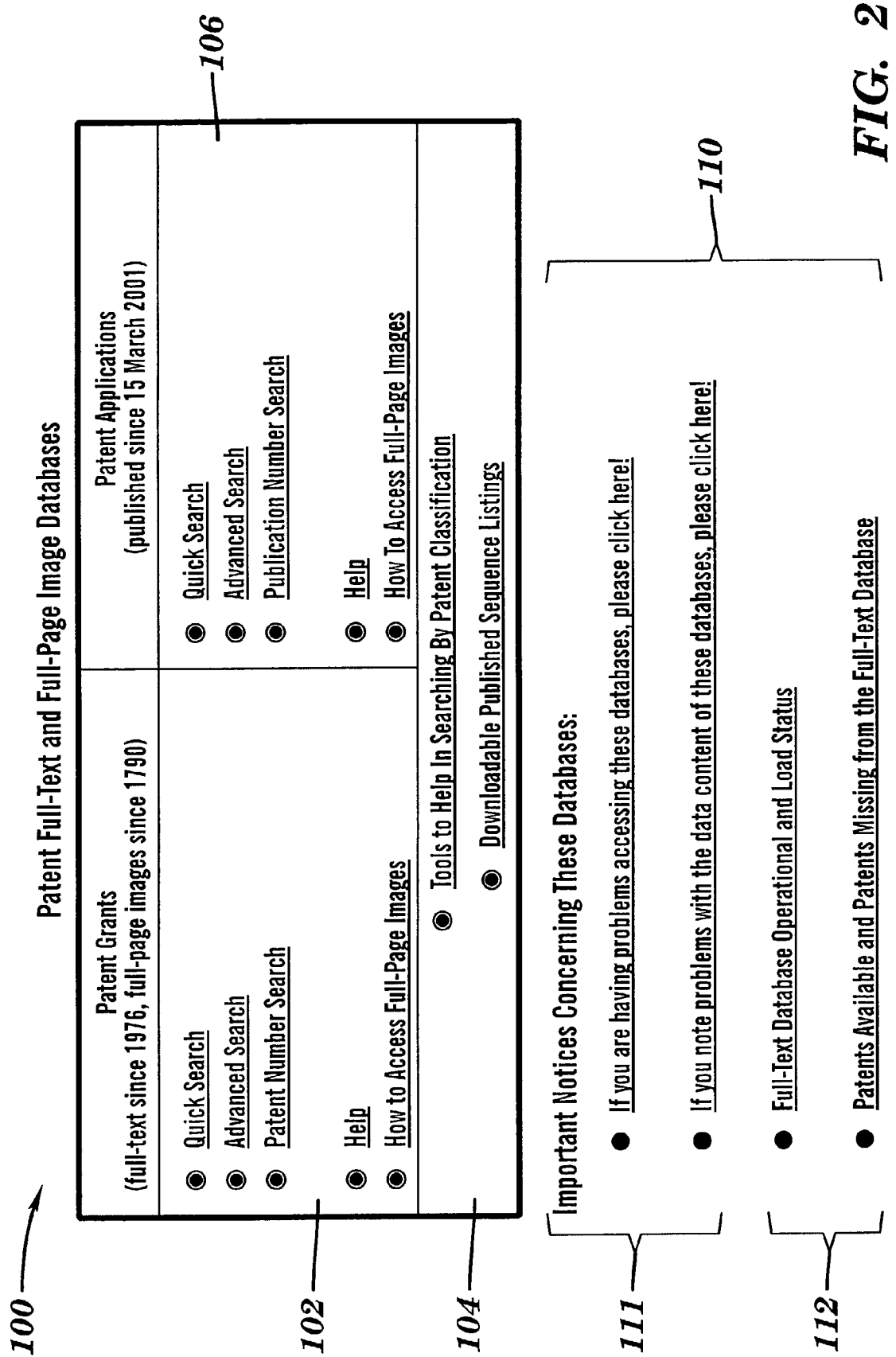
FIG. 2 depicts the web page of FIG. 1 with background shading removed, in accordance with embodiments of the present invention.
Figure 3:
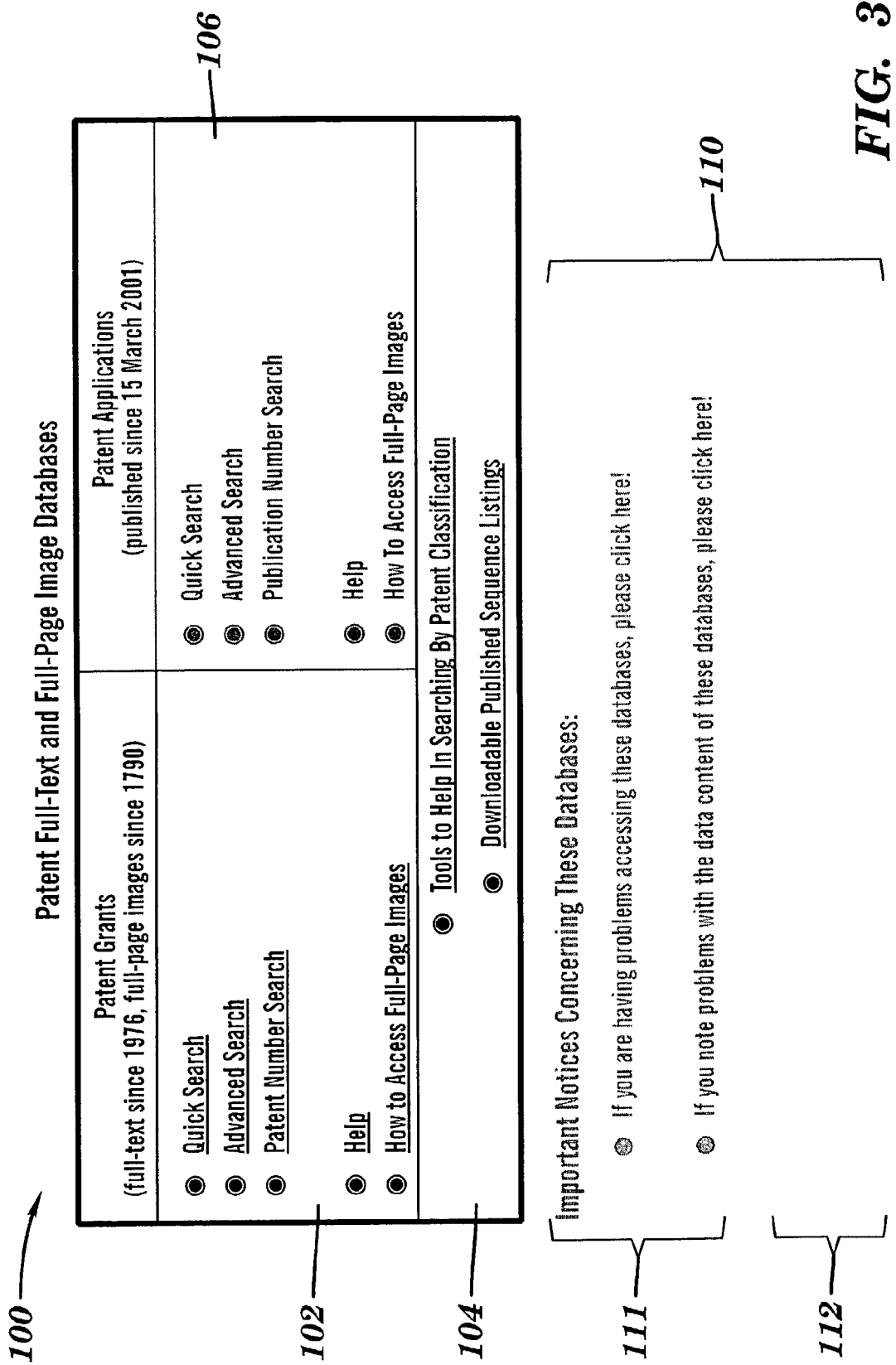
FIG. 3 depicts the web page of FIG. 2 with regions of the web page being printed more lightly than in FIG. 2, in accordance with embodiments of the present invention.

FIG. 1 depicts a web page 100 of an Internet website taken from the United States Patent Office (USPTO) website http://www.uspto.gov/patft/index.html, in accordance with embodiments of the present invention. The web page 100 is technically a truncated upper portion of the actual web page that exists at the aforementioned USPTO website but is treated herein as a full web page. The web page 100 comprises regions 102, 104, 106, and 110. The region 110 comprises subregions 111 and 112. The regions 102, 104, 106 are shown in FIG. 1 as having shaded backgrounds with text embedded therein, whereas the shaded backgrounds appear as colored backgrounds in the actual web page at the aforementioned USPTO website. FIGS. 2 and 3, described infra, illustrate a result of employing the present invention to selectively print portions of the web page 100 with reduced ink surface density.

FIG. 2 depicts the web page 100 of FIG. 1 with the shaded backgrounds removed for reasons of simplification, in accordance with embodiments of the present invention.

FIG. 3 depicts the web page 100 of FIG. 2 with regions 106 and 110 of the web page 100 being printed more lightly than in FIG. 2, in accordance with embodiments of the present invention. In FIG. 3, region 106 is printed with a lower ink surface density than is region 102, and region 110 is printed with a lower ink surface density than region 106. The phrase "ink surface density" means a mass of ink per unit surface area of the surface on which the ink is printed. As an example, if the printing is on a surface portion of a surface (e.g., on a sheet of paper), the ink surface density could be expressed in units of grams/mm$^2$; i.e., grams of ink per square millimeter of the surface portion on which the ink is printed. Additionally, subregion 112 within region 110 is printed in FIG. 3 with a lower ink surface density than is subregion 111. Indeed, subregion 112 appears in FIG. 3 with zero ink surface density; i.e., the contents of subregion 112 are not printed at all. Thus, FIG. 3 illustrates that the scope of the present invention generally includes printing regions of a web page selectively using one or more lower ink surface densities than a higher default ink surface density.

While FIG. 3 illustrates applying reduced ink surface density to text within a region of a web page, the scope of the present invention generally includes applying reduced ink surface density to any content (e.g., text, graphics, etc.) within a region of the web page. The scope of the present invention also includes applying reduced ink surface density to a shaded (or colored) background of a region such as the shaded backgrounds in regions 102, 104, 106 of FIG. 1. Reduced ink surface density may be applied independently to the content and the shaded (or colored) backgrounds of a region, or in a dependent manner such as, inter alia, reducing the ink surface density of the content and the background by a same percentage relative to the default ink surface density of the content and the background. The "default" default ink surface density is defined herein as the higher ink surface density that would be used but for the reduced ink surface density described herein.

While the preceding discussion of FIG. 3 (and subsequent discussions of other Figures herein) implies printing a web page with ink, the scope of the present invention generally encompasses printing with any material (e.g., ink) that may be used for printing a web page as such material is known to a person of ordinary skill in the art.

FIG. 3 illustrates the advantage of the present invention of reducing the amount of ink (or other printing material) that is used to print the web page 100. In practice, the present invention could be used to selectively print particular regions of a web page with a reduced ink surface density if said particular regions are of less interest (or of no interest) to a user linked to the Internet website than are regions printed with higher ink surface density.

Figure 4:
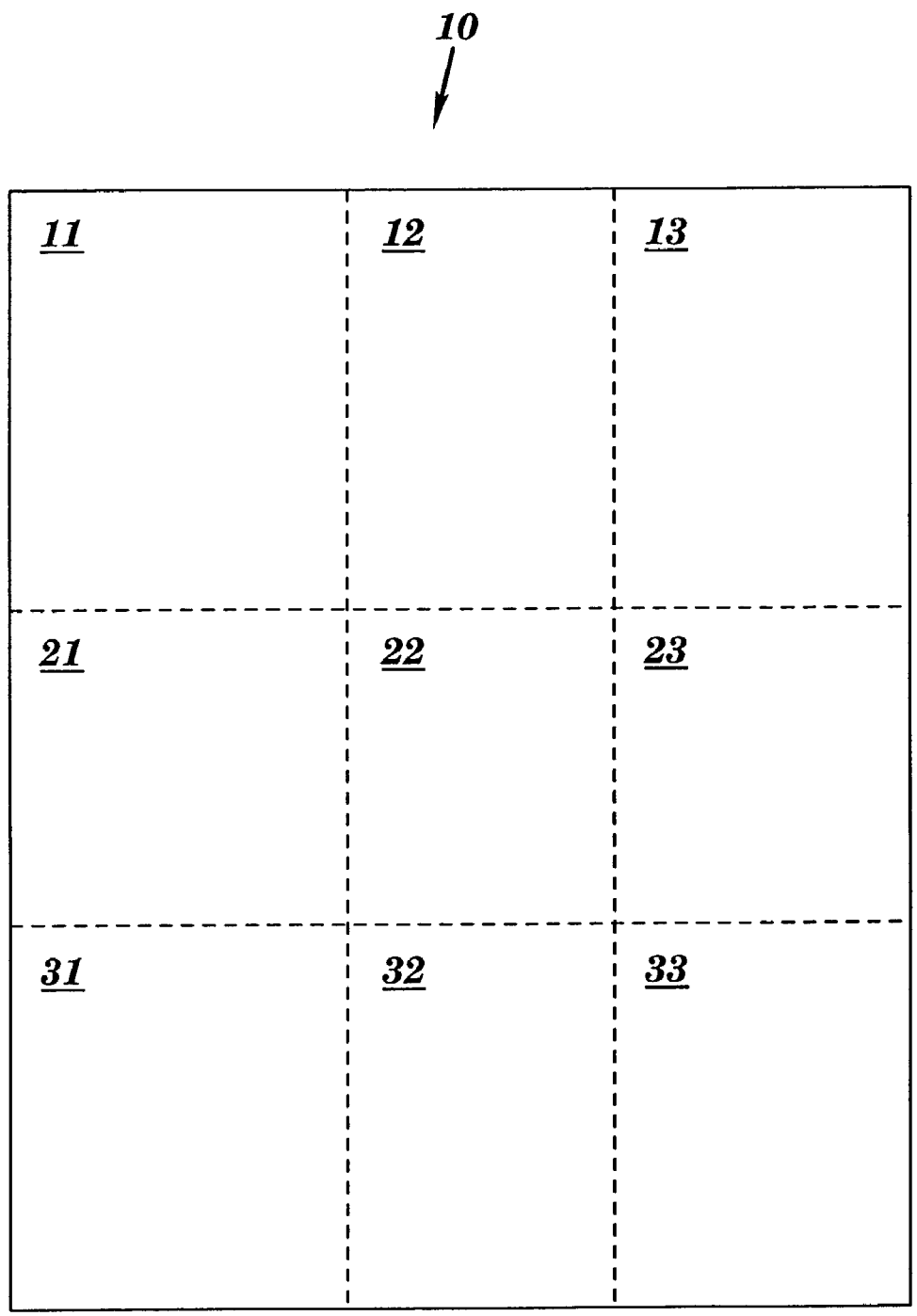
FIG. 4 depicts a web page partitioned into regions, in accordance with embodiments of the present invention.

FIG. 4 depicts a web page 10 partitioned into regions 11, 12, 13, 21, 22, 23, 31, 32, and 33, in accordance with embodiments of the present invention. Although not shown in FIG. 4, each of the aforementioned regions of the web page 10 may comprise content and background shading (or background color), with the understanding that zero content is a special case of content, and zero shading (or zero color) is a special case of shading (or color), so that one or more of said aforementioned regions of the web page 10 may comprise no content and/or no shading (or no color). The content may be any content (e.g., text content, graphics content, etc.) such as the text content depicted in FIG. 1 as discussed supra, and the background shading or color may be any background shading or color such as the background shading or color depicted in FIG. 1 as discussed supra. The web page 10 is to be printed such that the aforementioned web-page regions are to be selectively printed on a surface (e.g., on a sheet of paper) in accordance with an ink surface density that is a function of a time interval over which each region on the web page 10 has been appeared visible to a user linked to the web page 10, which is illustrated in FIGS. 5 and 6.

Figure 5:
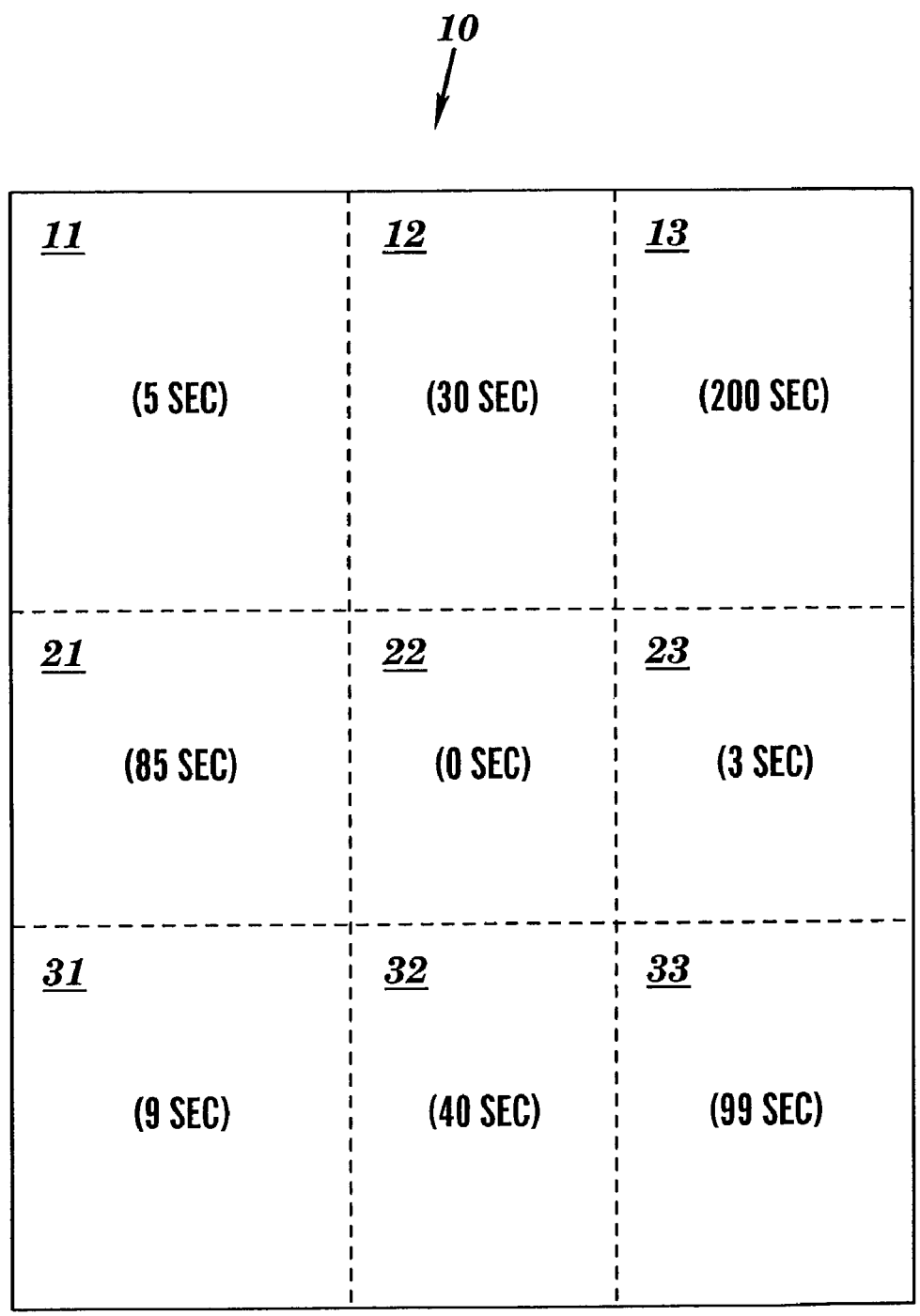
FIG. 5 depicts the web page of FIG. 4 with an indication of the time interval over which each region appeared visible to a user linked to the web page, in accordance with embodiments of the present invention.

FIG. 5 depicts the web page 10 of FIG. 4 with an indication of the time interval T(R) over which each region R appeared viewable to a user linked to the web page, in accordance with embodiments of the present invention. Time intervals T(11), T(12), T(13), T(21), T(22), T(23), T(31), T(32), and T(33) for viewability of the web page 10 to the user for regions 11, 12, 13, 21, 22, 23, 31, 32, and 33 are 5 seconds, 30 seconds, 200 seconds, 85 seconds, 0 seconds, 3 seconds, 9 seconds, 40 seconds, and 99 seconds, respectively. Note that 0 seconds means zero viewability time. The user may control the viewability time T(R) of each region R by selectively excluding regions from view. Such selective excluding of regions from view may be accomplished by, inter alia, independently reducing the horizontal and vertical extents of the window containing the web page by vertical scrolling and/or by compressing the horizontal and vertical dimensions of the window by appropriately dragging one or more corners of the window inward toward the interior of the window as may typically be done in a windowing system environment.

Figure 6:
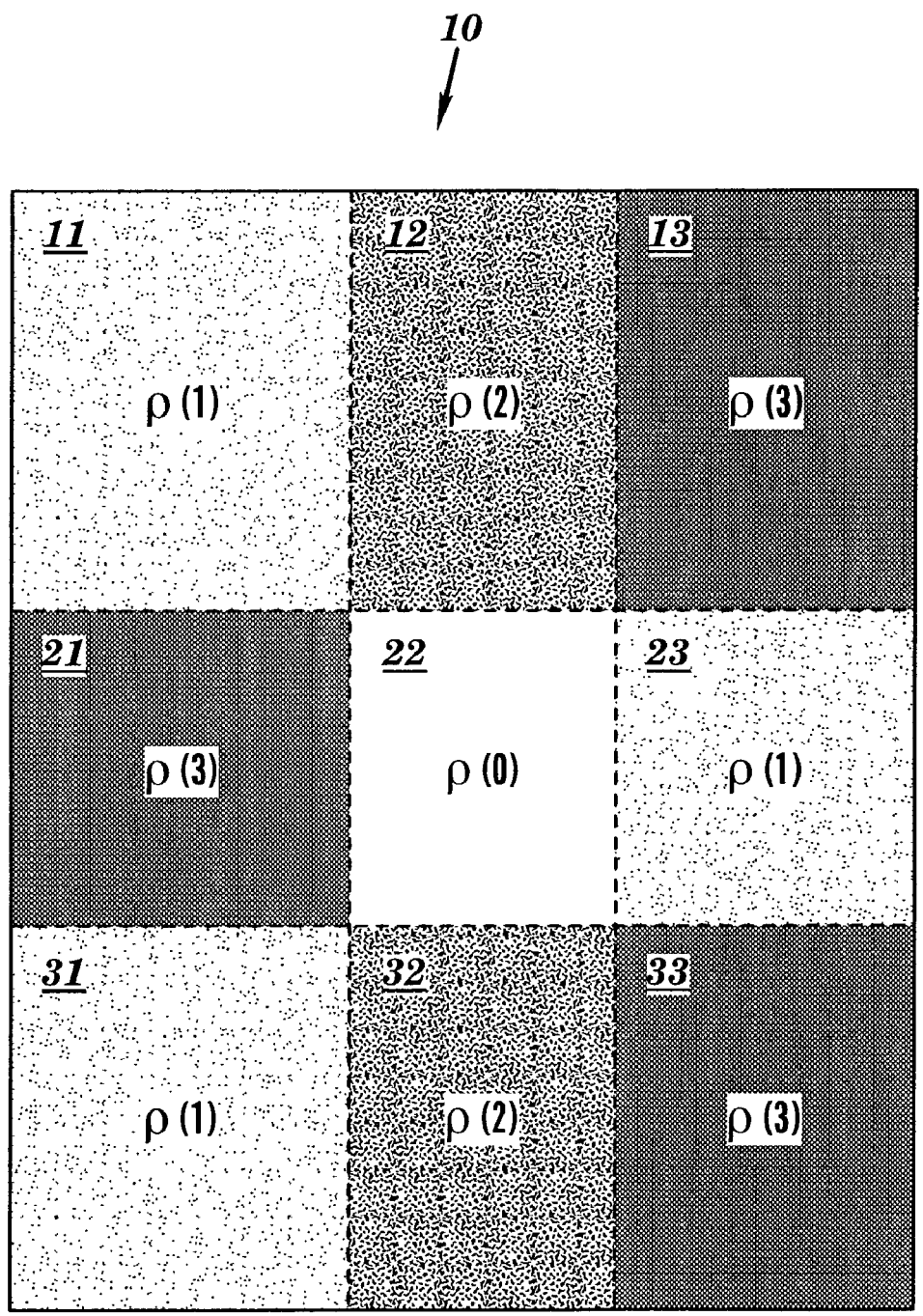
FIG. 6 depicts the web page of FIG. 4 with each region being printed with an ink density that reflects the time intervals in FIG. 5, in accordance with embodiments of the present invention.

FIG. 6 depicts the web page 10 of FIG. 4 with each region R being printed on as surface (e.g., on a sheet of paper) with an ink surface density $\rho_R$ that reflects the time intervals $T_R$ in FIG. 5, in accordance with embodiments of the present invention. FIG. 6 shows four ink surface densities, namely $\rho(0)$, $\rho(1)$, $\rho(2)$, and $\rho(3)$ such that $\rho(0)<\rho(1)<\rho(2)<\rho(3)$, wherein $\rho(3)$ is the default ink surface density, wherein region 22 is printed with ink surface density $\rho(0)$, wherein regions 11, 23, and 31 are printed with ink surface density $\rho(1)$, wherein regions 12 and 32 are printed with ink surface density $\rho(2)$, and wherein regions 13, 21, and 33 are printed with the default ink surface density $\rho(3)$. If $\rho_R$ denotes the ink surface density associated with region R, then $\rho_{22}=\rho(0)$, $\rho_{11}=\rho_{23}=\rho_{32}=\rho(1)$, $\rho_{12}=\rho_{31}=\rho(2)$, and $\rho_{13}=\rho_{21}=\rho_{33}=\rho(3)$. For any two regions $R_1$ and $R_2$, FIG. 6 illustrates the relation of $\rho_{R2} \geq \rho_{R1}$ if $T(R2)>T(R1)$; i.e., the ink surface density for a second region is at least the ink surface density for a first region if the viewability time of the second region exceeds the viewability time of the first region. For a minimum viewability time interval $T_{MIN}$, FIG. 6 also illustrates the relations of $\rho_R=\rho_{DEF}$ if $T(R)>T_{MIN}$ and $\rho_R<\rho_{DEF}$ if $T(R) \leq T_{MIN}$; i.e., the ink surface density $\rho_R$ equals the default ink surface density $\rho_{DEF}$ for those regions R having a viewability time interval $T(R)$ that exceeds the minimum viewability time interval $T_{MIN}$, and the ink surface density $\rho_R$ is less than $\rho_{DEF}$ for those regions R having a viewability time interval $T(R)$ that does not exceed $T_{MIN}$. In FIG. 6, $\rho_{DEF}=\rho(3)$ and $T_{MIN}$ is any value of at least 40 seconds and less than 85 seconds. Note that in FIG. 6, $\rho_R$ is constant for each $\rho_R$ satisfying $\rho_R<\rho_{DEF}$. Also note that in FIG. 6, $\rho_{22}=\rho_0=0$ at $T(22)=0$; i.e., nothing is printed where the viewability time is zero, which is an embodiment but not a required embodiment. Although not shown in FIG. 6, one could constrain reduced ink surface density exclusively to regions that are not viewable at all which could be described mathematically by setting $T_{MIN}=0$.

Figure 11:
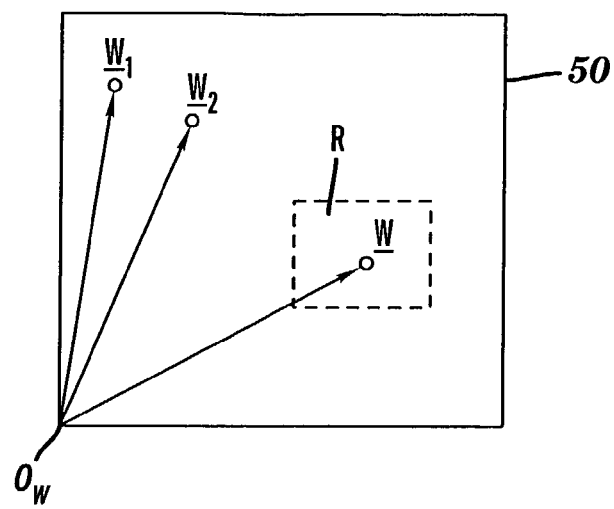
FIG. 11 depicts a web page with points thereon denoted, in accordance with embodiments of the present invention.
Figure 12:
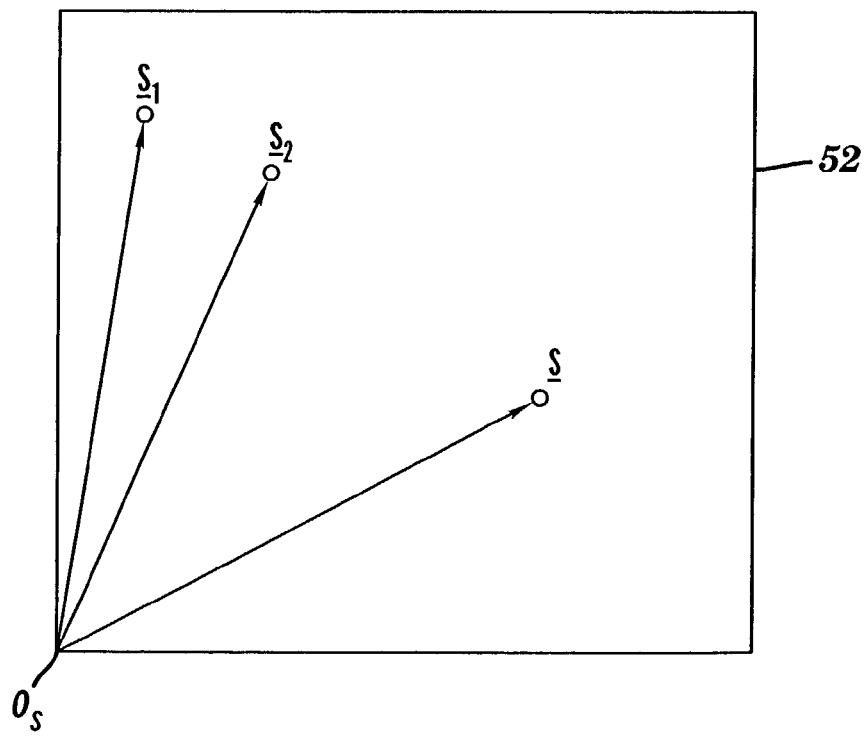
FIG. 12 depicts a surface for displaying the web page of FIG. 11 as printed and showing a mapping of the points of FIG. 11, in accordance with embodiments of the present invention.

All of the preceding mathematical relationships discussed supra in conjunction with FIG. 6 could be rewritten in terms of points on a web page instead of in terms of regions on a web page since a point is a region in the limit of arbitrarily small region size, as is described infra in conjunction with FIGS. 11–12.

Figure 7:
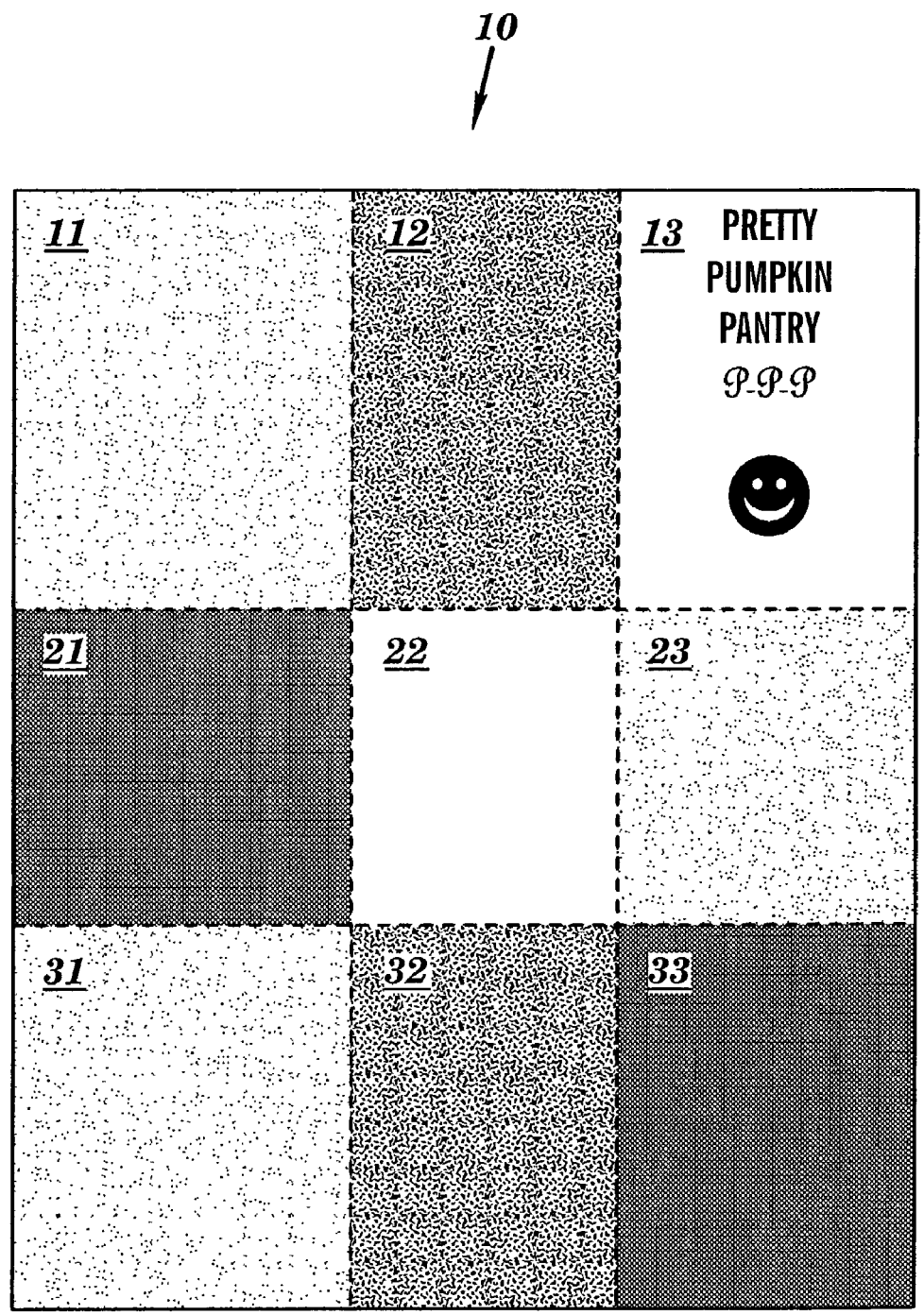
FIG. 7 depicts the printed web page of FIG. 6 with an advertisement appearing in one of the regions, in accordance with embodiments of the present invention.
Figure 8:
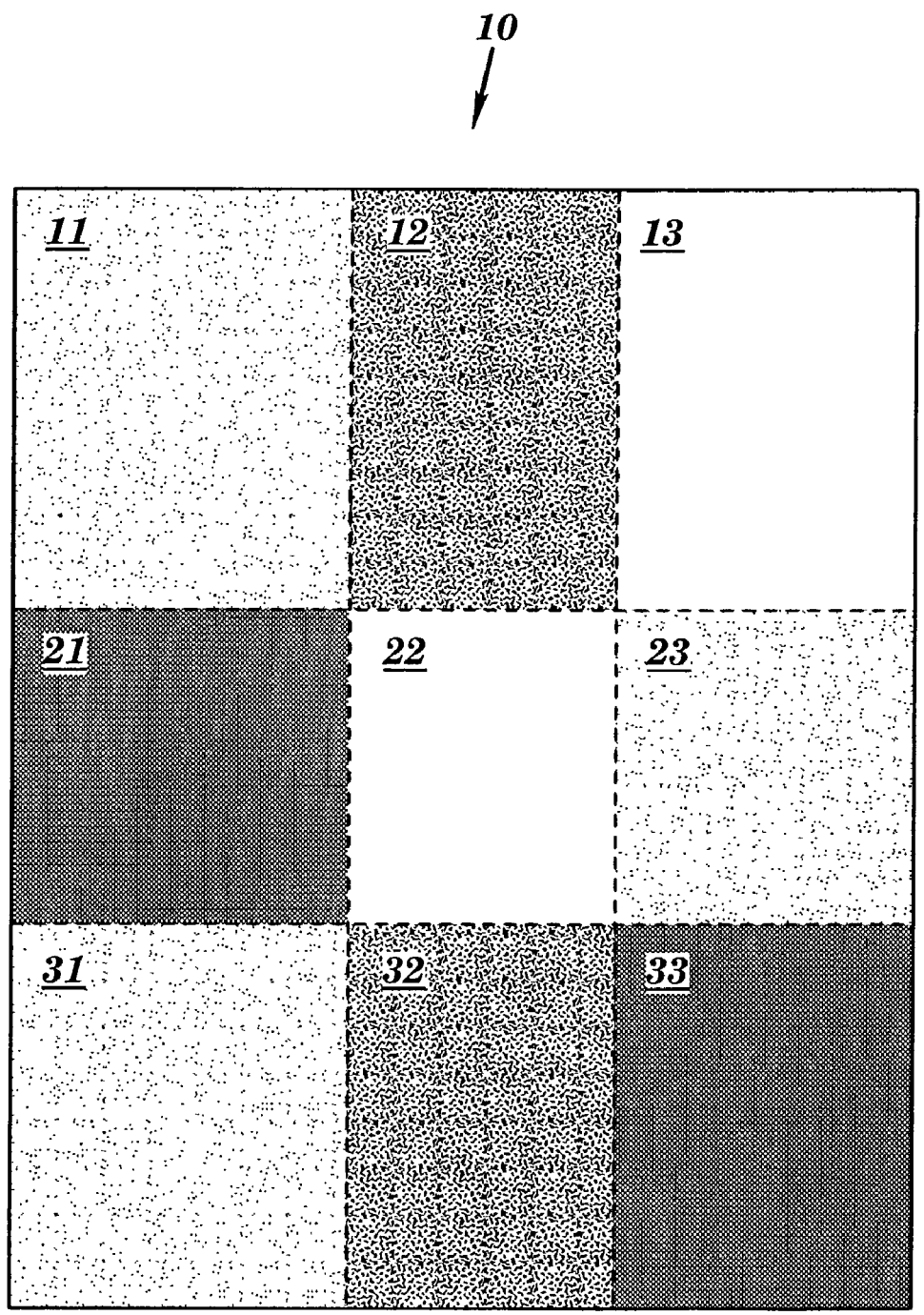
FIG. 8 depicts the printed web page of FIG. 7 with the advertisement removed, in accordance with embodiments of the present invention.

FIG. 7 depicts the printed web page 10 of FIG. 6 with an advertisement appearing in region 13, in accordance with embodiments of the present invention. The present invention permits printing at a reduced ink surface density (or no printing at all) for a region containing an advertisement. Accordingly, FIG. 8 depicts the printed web page of FIG. 7 with the advertisement removed from region 13, in accordance with embodiments of the present invention. Thus, in FIG. 8, $\rho_{13}=\rho_0=0$.

Figure 9:
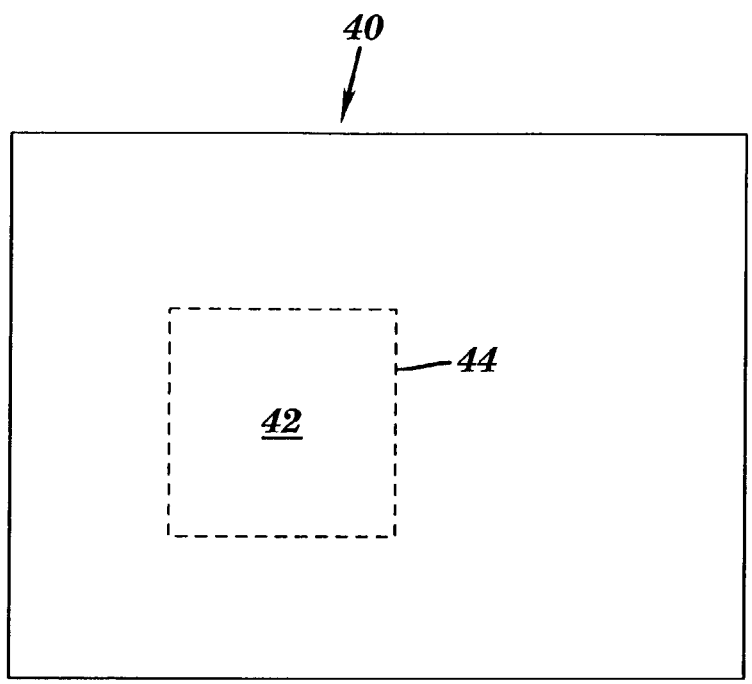
FIG. 9 depicts a web page identifying a region whose contents should be printed with a reduced ink surface density relative to the default ink surface density, in accordance with embodiments of the present invention.

FIG. 9 depicts a web page 40 identifying a region 42 within the dotted lines 44, wherein the region's contents (not shown) and/or background shading/color (not shown) should be printed with a reduced ink surface density relative to the default ink surface density, in accordance with embodiments of the present invention. The reduced ink surface density for the region 42 may be a constant ink surface density $\rho_C$, and no printing may be chosen (i.e., $\rho_C=0$).

Figure 10:
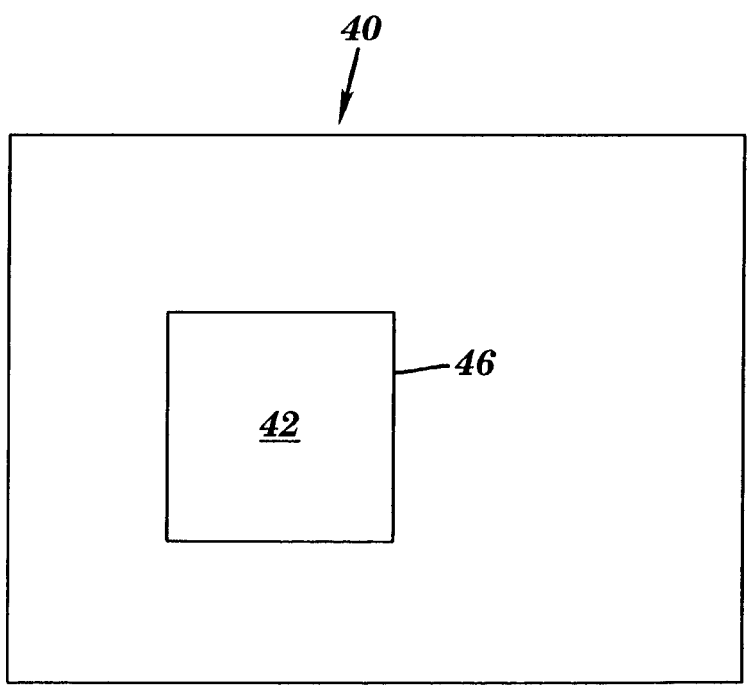
FIG. 10 depicts the web page of FIG. 9 with a closed contour bounding the region to be printed with the reduced ink surface density, in accordance with embodiments of the present invention.

FIG. 10 depicts the web page 40 of FIG. 9 with a closed contour 46 bounding the region 42 to be printed with a reduced ink surface density, in accordance with embodiments of the present invention. The closed contour 46 may have been created by the user of web page 40, such that the closed contour 46 coincides with the dotted lines 44 of FIG. 9 so as to bound the region 42.

FIGS. 11–12 illustrate notation for expressing in pointwise form mathematical relationships expressed supra in regionwise form in conjunction with FIGS. 4–9. FIG. 11 depicts a web page 50 with points thereon denoted as points $\underline{W}_1$ and $\underline{W}_2$ as well as a general point $\underline{W}$, in accordance with embodiments of the present invention. The points $\underline{W}_1$, $\underline{W}_2$, and the general point $\underline{W}$, are expressed as vectors from a coordinate origin $O_W$. FIG. 12 depicts a surface 52 for displaying the printed web page 50 of FIG. 11 as printed on the surface 52, in accordance with embodiments of the present invention. FIG. 12 shows a mapping of the points of $\underline{W}_1$, $\underline{W}_2$, and the general point $\underline{W}$ into corresponding points $\underline{S}_1$, $\underline{S}_2$, and the general point $\underline{S}$ respectively, on the surface 52 of FIG. 12. The points $\underline{S}_1$, $\underline{S}_2$, and the general point $\underline{S}$, are expressed as vectors from a coordinate origin $O_S$. In FIGS. 11–12, $\underline{S}$ corresponds to $\underline{W}$ in accordance with a mapping relationship that maps the web page 50 onto the surface 52. In considering a region R on the web page 50 as being transformed to the point W by shrinking R to dimensions that approach zero, the mathematical relationships developed supra for the general region R become analogous relationships in terms of the points $\underline{W}_1$, $\underline{W}_2$, and $\underline{W}$ the web page 50 and the corresponding mapped points $\underline{S}_1$, $\underline{S}_2$, and $\underline{S}$ on the surface 52. Also the printing material will be considered as any applicable printing material such as ink.

The web page 50 of an Internet website may be printed on the surface 52 so as to distribute a printing material on the surface 52 in accordance with a non-uniform spatial distribution of a material surface density $\rho(\underline{S})$ of the material on the surface 52. A web browser receives a specification of $\rho(\underline{S})$ as a function of a time interval $T(\underline{W})$ over which the point $\underline{W}$ on the web page 50 has appeared viewable to a user linked to the web page 50. $\underline{S}$ corresponds to $\underline{W}$ by a mapping relationship as discussed supra. The web browser prints the web page 50 on the surface 52, including distributing the material on the surface 52 in accordance with $\rho(\underline{S})$.

The material surface density $\rho(\underline{S})$ may satisfy: $\rho(\underline{S}_2) \geq \rho(\underline{S}_1)$ wherever $T(\underline{W}_2)>T(\underline{W}_1)$ for any two points $S_1$ and $S_2$ on the surface, wherein $S_1$ and $S_2$ on the surface 52 respectively correspond to points $W_1$ and $W_2$ on the web page 50 as discussed supra.

The material surface density $\rho(\underline{S})$ may satisfy: $\rho(\underline{S})=\rho_{DEF}$ if $T(\underline{W})>T_{MIN}$ and $\rho(\underline{S})<\rho_{DEF}$ if $T(\underline{W}) \leq T_{MIN}$. The density $\rho_{DEF}$ is a default surface density of the material. The time interval $T_{MIN}$ is a specified minimum time interval above which the pertinent point $\underline{S}$ is to be printed at the default surface density $\rho_{DEF}$.

The material surface density $\rho(\underline{S})$ may satisfy: $\rho(\underline{S})=\rho_0$ if $T(\underline{W}) \leq T_{MIN}$, wherein $\rho_0$ is constant. $T_{MIN}$ may satisfy $T_{MIN}=0$ and $\rho_0$ may have the value $\rho_0=0$.

The material surface density $\rho(\underline{S})$ may satisfy: $\rho(\underline{S})=0$ wherever $T(\underline{W})=0$.

The material surface density $\rho(\underline{S})$ may satisfy: $\rho(\underline{S})=0$ if advertising content exists at $\underline{W}$.

Figure 13:
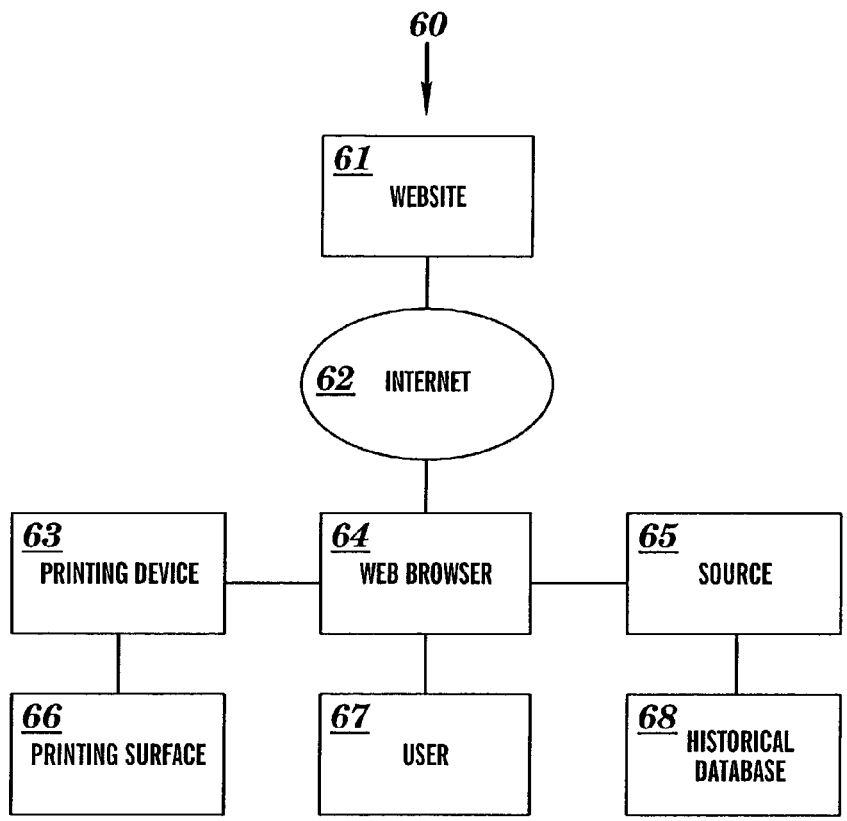
FIG. 13 depicts a system for printing a web page, in accordance with embodiments of the present invention.

FIG. 13 depicts a system 60 for printing a web page, in accordance with embodiments of the present invention. A user 67 communicates with a website 61 across the Internet 62 (or across an analogous communication interface generally) to access a web page of the website 61 through use of a web browser 64. The web browser 64 is coupled to a printing device 63 which is used to print the web page on a printing surface 66 (e.g., a surface on a sheet of paper) in accordance with a material surface density $\rho_R$ or $\rho(\underline{S})$ as discussed supra in conjunction with FIGS. 1–12.

The material surface density $\rho_R$ or $\rho(\underline{S})$ may become available for use by the web browser 64: from calculating $\rho_R$ or $\rho(\underline{S})$ by the web browser 64; or from receiving $\rho_R$ or $\rho(\underline{S})$ by the web browser 64 from outside of the web browser 64, such as from a source 65 that is coupled to the web browser 64. The source 65 may be a plugin executing under control of the web browser 64 or may be a service outside of the website 60 such that the service executes without being under control by the web browser 64. Note that $\rho_R$ is keyed to the region R within the web page while $\rho(\underline{S})$ is keyed to the spatial point $\underline{S}$ on the surface on which the web page is to be printed. This distinction is not significant, however, since the web page is mapped onto the surface for printing purposes so that $\rho_R$ is likewise mapped into the region R' on the surface leading to a mapped density $\rho_{R'}$ in terms of the region R' on the surface to be printed upon. Additionally, the pointwise material surface density distribution $\rho(\underline{S})$ may be used to define regionwise material surface density distributions, since a region may be expressed as a continuous distribution of points (or a discrete distribution of points as a numerical approximation) comprised by the region.

The source 65 may provide a specification of $\rho_R$ or $\rho(\underline{S})$ to the web browser 64 based on historical data relating to frequency of use of portions (i.e., regions) of the web page by users linked to the web page. Here, the surface density $\rho(\underline{S})$ is a function of a statistically-averaged time interval $T_{AVE}(\underline{W})$ over which a point $\underline{W}$ on the web page has historically appeared viewable to said users linked to the web page. Such historical data may be accumulated in a historical database 68 to which the source 65 is coupled. The historical data may be accumulated in any manner such as by having the web browser 64 (as well as other web browsers coupled to the source 65) collect T(R) or T($\underline{W}$) data for various web pages to which users are linked. The web browser 64 transmits said such collected data to the source 65 for storage in the historical database 68 and subsequent analysis by (or for) the source 65 to develop a model or algorithm for calculating $\rho_R$ or $\rho(\underline{S})$ for each web page of the website 61.

With the statistical approach, the material surface density $\rho_R$ or $\rho(\underline{S})$ may satisfy any of the mathematical relationships discussed supra with $T_{AVE}(\underline{W})$ substituting for $T(\underline{W})$. For example, $\rho_R$ or $\rho(\underline{S})$ is generally a function of the average time interval $T_{AVE}(\underline{W})$ rather than of $T(\underline{W})$. Similarly, $\rho(\underline{S}_2) \geq \rho(\underline{S}_1)$ wherever $T_{AVE}(\underline{W}_2) > T_{AVE}(\underline{W}_1)$ rather than wherever $T(\underline{W}_2) > T(\underline{W}_1)$. Analogously, the mathematical relationships relating to T(R), as discussed supra in conjunction with FIG. 6, may be modified by substituting a statistically averaged region-dependent time interval $T_{AVE}(R)$ wherever T(R) appears. The statistical averaging, whether for $T_{AVE}(\underline{W})$ or $T_{AVE}(R)$, may be by any desired averaging method such as arithmetic averaging, weighted averaging, etc. For example with N values of T of $T_1$, $T_2$, ..., $T_N$, where T stands for either T($\underline{W}$) or T(R), the arithmetic average of T is computed as $(T_1+T_2+\ldots+T_N)/N$. For the same N values of T, the weighted average of T is computed as $(W_1T_1+W_2T_2+\ldots+W_NT_N)/(W_1+W_2+\ldots+W_N)$, wherein the weights $W_1, W_2, \ldots, W_N$ may be based on any desired weighting criteria.

While FIG. 13 depicts Internet 62, the Internet 62 can be replaced by any communication interface (e.g., an intranet) across which a web page or its equivalent may be accessed by software (e.g., a web browser or its equivalent) coupled to the user 67 such that said software may effectuate printing the web page on the printing surface 66 of the printing device 63. Thus, the web browser 64 may likewise be replaced by any software that may effectuate said printing of the web page.

Figure 14:
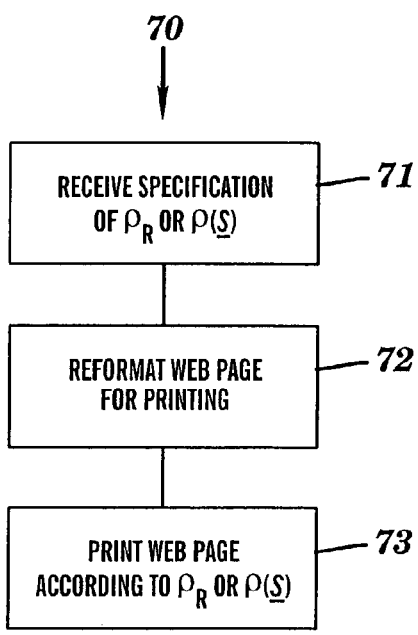
FIG. 14 depicts a flow chart for printing a web page, in accordance with embodiments of the present invention.

FIG. 14 depicts a flow chart 70 for printing a web page, in accordance with embodiments of the present invention. The flow chart 70 comprises steps 71–73. In step 71, the browser 64 of FIG. 13 receives specification of $\rho_R$ or $\rho(\underline{S})$ as described supra in conjunction with FIGS. 1–13. In step 72, which may be executed but is not required, the web page is reformatted for printing. Step 73 prints the web page according to $\rho_R$ or $\rho(\underline{S})$ such as by the web browser 64, wherein the material is distributed on the printing surface 66 by the printing device 63 (see FIG. 13).

Figure 15:
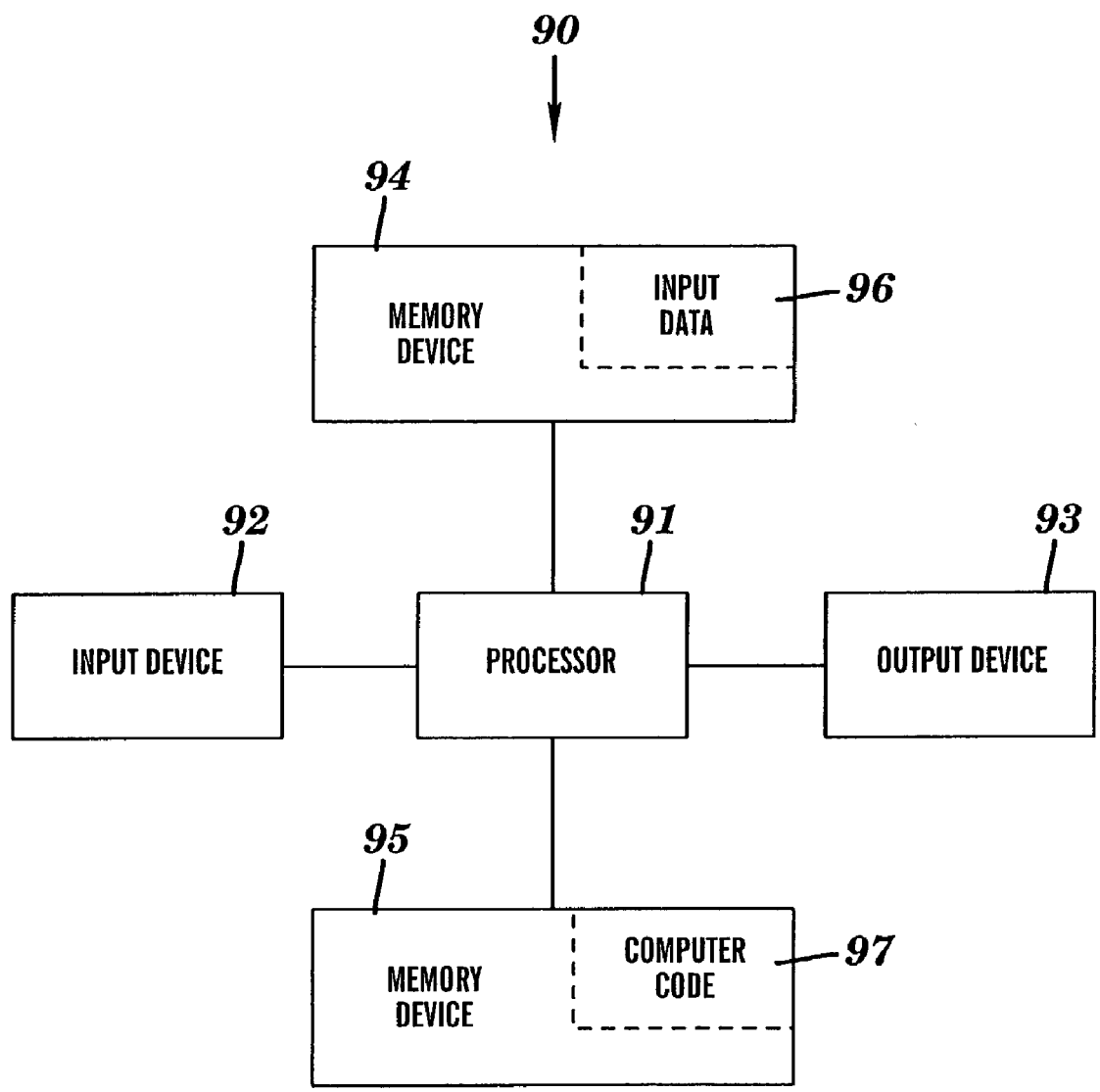
FIG. 15 depicts a computer system for printing a web page, in accordance with embodiments of the present invention.

FIG. 15 illustrates a computer system 90 for printing a web page, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 is one or more output devices comprising the printing device 63 of FIG. 13. The output device 93 may also comprise a plotter, a computer screen, a magnetic tape, a removable hard disk, a floppy disk, etc. The memory devices 94 and 95 may be, inter alia, a hard disk, a dynamic random access memory (DRAM), a read-only memory (ROM), etc. The memory device 95 includes a computer code 97 such as the browser 64 of FIG. 13. The computer code 97 includes an algorithm for printing a web page in accordance with the present invention as described supra. The processor 91 executes the computer code 97. The memory device 94 includes input data 96. The input data 96 includes input required by the computer code 97. The output device 93 displays output from the computer code 97. Either or both memory devices 94 and 95 may be used as computer usable medium having a computer readable program code embodied therein, wherein the computer readable program code comprises the computer code 97.

While FIG. 15 shows the computer system 90 as a particular configuration of hardware and software, any configuration of hardware and software, as would be known to a person of ordinary skill in the art, may be utilized for the purposes stated supra in conjunction with the particular computer system 90 of FIG. 15. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for printing a web page of a website on a surface so as to distribute a printing material on the surface in accordance with a non-uniform spatial distribution of a material surface density $\rho(\underline{S})$ of the material on the surface, wherein $\underline{S}$ denotes a point on the surface, said method comprising:

receiving, by a web browser, a specification of $\rho(\underline{S})$ as a function of a time interval T($\underline{W}$) over which a point $\underline{W}$ on the web page has been appeared viewable to a user linked to the web page, and wherein $\underline{S}$ corresponds to $\underline{W}$ by a mapping relationship; and printing, by the web browser, the web page on the surface, including distributing the material on the surface in accordance with $\rho(\underline{S})$.

2. The method of claim 1, wherein the printing material includes ink.

3. The method of claim 1, wherein $\rho(\underline{S}_2) \geq \rho(\underline{S}_1)$ wherever $T(\underline{W}_2) > T(\underline{W}_1)$ for any two points $S_1$ and $S_2$ on the surface, and wherein $S_1$ and $S_2$ respectively correspond to points $W_1$ and $W_2$ on the web page.

4. The method of claim 3, wherein $\rho(\underline{S}) = \rho_{DEF}$ if $T(\underline{W}) > T_{MIN}$ and $\rho(\underline{S}) < \rho_{DEF}$ if $T(\underline{W}) \leq T_{MIN}$, wherein $\rho_{DEF}$ is a default surface density of the material, and wherein $T_{MIN}$ is a specified minimum time interval.

5. The method of claim 4, wherein $\rho(\underline{S}) = \rho_0$ if $T(\underline{W}) \leq T_{MIN}$, and wherein $\rho_0$ is constant.

6. The method of claim 4, wherein $T_{MIN} = 0$.

7. The method of claim 1, wherein $\rho(\underline{S}) = 0$ wherever $T(\underline{W}) = 0$.

8. The method of claim 1, wherein $\rho(\underline{S}) = 0$ if advertising content exists at $\underline{W}$.

9. The method of claim 1, wherein receiving $\rho(\underline{S})$ results from calculating $\rho(\underline{S})$.

10. The method of claim 9, wherein calculating $\rho(\underline{S})$ is executed by the web browser.

11. The method of claim 9, wherein calculating $\rho(\underline{S})$ is executed outside of the web browser.

12. The method of claim 1, further comprising reformatting the web page after said receiving and prior to said printing.

13. The method of claim 1, wherein said receiving comprises receiving $\rho(\underline{S})$ from a source.

14. The method of claim 13, wherein the source is a plugin executing under control of the web browser.

15. The method of claim 13, wherein the source is a service outside of the website.

16. A method for printing a web page of an Internet website on a surface so as to distribute a printing material on the surface in accordance with a non-uniform spatial distribution of a material surface density $\rho(\underline{S})$ of the material on the surface, wherein $\underline{S}$ denotes a point on the surface, said method comprising:
receiving, by a web browser, a specification of $\rho(\underline{S})$ based on historical data relating to frequency of use of portions of the web page by users linked to the web page, and wherein $\rho(\underline{S})$ is a function of a statistically-averaged time interval $T_{AVE}(\underline{W})$ over which a point $\underline{W}$ on the web page has historically appeared viewable to said users linked to the web page; and
printing, by the web browser, the web page on the surface, including distributing the material on the surface in accordance with $\rho(\underline{S})$.

17. The method of claim 16, wherein $\rho(\underline{S}_2) \geq \rho(\underline{S}_1)$ wherever $T_{AVE}(\underline{W}_2) > T_{AVE}(\underline{W}_1)$ for any two points $S_1$ and $S_2$ on the surface, and wherein $S_1$ and $S_2$ respectively correspond to points $W_1$ and $W_2$ on the web page.

18. A method for printing a web page of an Internet website on a surface so as to distribute a printing material on the surface in accordance with a non-uniform spatial distribution of a material surface density $\rho(\underline{S})$ of the material on the surface, wherein $\underline{S}$ denotes a point on the surface, said method comprising:
receiving, by a web browser, a specification of $\rho(\underline{S})$ in accordance with a selection having been made by a user linked to the web page, said selection being a selection of at least one region of the web page at which $\rho(\underline{S}) = \rho_C$, wherein $\rho_C$ is a constant material surface density that is less than a default surface density at which the region would otherwise be printed.
printing, by the web browser, the web page on the surface, including distributing the material on the surface in accordance with $\rho(\underline{S})$ being equal to $\rho_C$ for the region.

19. The method of claim 18, wherein $\rho_C = 0$.

20. The method of claim 18, wherein the selection by the user comprises a creation, by the user, of a closed contour on the web page such that the closed contour bounds the region.

21. A computer system comprising a computer readable medium for storing an algorithm for printing a web page of a website on a surface so as to distribute a printing material on the surface in accordance with a non-uniform spatial distribution of a material surface density $\rho(\underline{S})$ of the material on the surface, wherein $\underline{S}$ denotes a point on the surface, wherein the algorithm is adapted to:
receive a specification of $\rho(\underline{S})$ as a function of a time interval $T(\underline{S})$ over which a point W on the web page has been appeared viewable to a user linked to the web page, and wherein $\underline{S}$ corresponds to $\underline{W}$ by a mapping relationship; and
printing the web page on the surface by having the material distributed on the surface in accordance with $\rho(\underline{S})$.

22. The computer system of claim 21, wherein the printing material includes ink.

23. The computer system of claim 21, wherein $\rho(\underline{S}_2) \geq \rho(\underline{S}_1)$ wherever $T(\underline{W}_2) > T(\underline{W}_1)$ for any two points $S_1$ and $S_2$ on the surface, and wherein $S_1$ and $S_2$ respectively correspond to points $W_1$ and $W_2$ on the web page.

24. The computer system of claim 23, wherein $\rho(\underline{S}) = \rho_{DEF}$ if $T(\underline{W}) > T_{MIN}$ and $\rho(\underline{S}) < \rho_{DEF}$ if $T(\underline{W}) \leq T_{MIN}$, wherein $\rho_{DEF}$ is a default surface density of the material, and wherein $T_{MIN}$ is a specified minimum time interval.

25. The computer system of claim 24, wherein $\rho(\underline{S}) = \rho_0$ if $T(\underline{W}) \leq T_{MIN}$, and wherein $\rho_0$ is constant.

26. The computer system of claim 24, wherein $T_{MIN} = 0$.

27. The computer system of claim 21, wherein $\rho(\underline{S}) = 0$ wherever $T(\underline{W}) = 0$.

28. The computer system of claim 21, wherein $\rho(\underline{S}) = 0$ if advertising content exists at $\underline{W}$.

29. The computer system of claim 21, wherein the algorithm is adapted to receive $\rho(\underline{S})$ from a calculation of $\rho(\underline{S})$.

30. The computer system of claim 29, wherein the calculation of $\rho(\underline{S})$ is performed by a web browser that exists within the computer system.

31. The computer system of claim 29, wherein the calculation of $\rho(\underline{S})$ is performed outside of a web browser that exists within the computer system.

32. The computer system of claim 21, the algorithm is further adapted to reformat the web prior to a printing of the web page.

33. The computer system of claim 21, the algorithm is adapted to receive $\rho(\underline{S})$ from a source.

34. The computer system of claim 33, wherein the source is a plugin executing under control of the web browser.

35. The computer system of claim 33, wherein the source is a service outside of the website.

36. A computer system comprising a computer readable medium for storing an algorithm for printing a web page of an Internet website on a surface so as to distribute a printing material on the surface in accordance with a non-uniform spatial distribution of a material surface density $\rho(\underline{S})$ of the material on the surface, wherein $\underline{S}$ denotes a point on the surface, wherein the algorithm is adapted to:
receive a specification of $\rho(\underline{S})$ based on historical data relating to frequency of use of portions of the web page by users linked to the web page, and wherein $\rho(\underline{S})$ is a function of a statistically-averaged time interval $T_{AVE}(\underline{W})$ over which a point $\underline{W}$ on the web page has historically appeared viewable to said users linked to the web page; and print the web page on the surface by having the material distributed on the surface in accordance with $\rho(\underline{S})$.

37. The computer system of claim 36, wherein $\rho(\underline{S}_2) \geq \rho(\underline{S}_1)$ wherever $T_{AVE}(\underline{W}_2) > T_{AVE}(\underline{W}_1)$ for any two points $S_1$ and $S_2$ on the surface, and wherein $S_1$ and $S_2$ respectively correspond to points $W_1$ and $W_2$ on the web page.

38. A computer system comprising a computer readable medium for storing an algorithm for printing a web page of an Internet website on a surface so as to distribute a printing material on the surface in accordance with a non-uniform spatial distribution of a material surface density $\rho(\underline{S})$ of the material on the surface, wherein $\underline{S}$ denotes a point on the surface, wherein the algorithm is adapted to:

receive a specification of $\rho(\underline{S})$ in accordance with a selection having been made by a user linked to the web page, said selection being a selection of at least one region of the web page at which $\rho(\underline{S})=\rho_C$, wherein $\rho_C$ is a constant material surface density that is less than a default surface density at which the region would otherwise be printed; and printing the web page on the surface by having the material distributed on the surface in accordance with $\rho(\underline{S})$ being equal to $\rho_C$ for the region.

39. The computer system of claim 38, wherein $\rho_C=0$.

40. The computer system of claim 38, wherein the selection by the user comprises a creation, by the user, of a closed contour on the web page such that the closed contour bounds the region.

41. A computer program product embodying computer executable instructions, for printing a web page of an Internet website on a surface so as to distribute a printing material on the surface in accordance with a non-uniform spatial distribution of a material surface density $\rho(\underline{S})$ of the material on the surface, wherein $\underline{S}$ denotes a point on the surface, wherein the computer readable instructions comprises an algorithm adapted to:

receive a specification of $\rho(\underline{S})$ as a function of a time interval $T(\underline{W})$ over which a point $\underline{W}$ on the web page has been appeared viewable to a user linked to the web page, and wherein $\underline{S}$ corresponds to $\underline{W}$ by a mapping relationship; and wherein $\underline{S}$ corresponds to $\underline{W}$ by a mapping relationship; and printing the web page on the surface by having the material distributed on the surface in accordance with $\rho(\underline{S})$.

42. The computer program product of claim 41, wherein the material includes ink.

43. The computer program product of claim 41, wherein $\rho(\underline{S}_2) \geq \rho(\underline{S}_1)$ wherever $T(\underline{W}_2) > T(\underline{W}_1)$ for any two points $S_1$ and $S_2$ on the surface, and wherein $S_1$ and $S_2$ respectively correspond to points $W_1$ and $W_2$ on the web page.

* * * * *